United States Patent
Li et al.

(10) Patent No.: US 11,775,776 B2
(45) Date of Patent: Oct. 3, 2023

(54) METHOD AND APPARATUS FOR PROCESSING INFORMATION

(71) Applicant: BEIJING BAIDU NETCOM SCIENCE AND TECHNOLOGY CO., LTD., Beijing (CN)

(72) Inventors: Shuangjie Li, Beijing (CN); Miao Yu, Beijing (CN); Yabing Shi, Beijing (CN); Xuefeng Hao, Beijing (CN); Xunchao Song, Beijing (CN); Ye Jiang, Beijing (CN); Yang Zhang, Beijing (CN); Yong Zhu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 256 days.

(21) Appl. No.: 17/147,881

(22) Filed: Jan. 13, 2021

(65) Prior Publication Data
US 2021/0216725 A1    Jul. 15, 2021

(30) Foreign Application Priority Data

Jan. 14, 2020 (CN) .......................... 202010034773.7

(51) Int. Cl.
*G06F 40/40* (2020.01)
*G06N 20/00* (2019.01)
*G06F 40/289* (2020.01)

(52) U.S. Cl.
CPC ............ *G06F 40/40* (2020.01); *G06F 40/289* (2020.01); *G06N 20/00* (2019.01)

(58) Field of Classification Search
CPC ........ G06F 40/40; G06F 40/289; G06F 40/30; G06F 40/284; G06N 20/00; G06N 3/0481;

(Continued)

(56) References Cited

U.S. PATENT DOCUMENTS

| 2005/0278623 | A1  | 12/2005 | Dehlinger et al. |
| 2021/0165960 | A1* | 6/2021  | Eisenschlos ............ G06F 40/30 |
| 2022/0215177 | A1* | 7/2022  | Chen ........................ G06N 5/04 |

FOREIGN PATENT DOCUMENTS

| CN | 107766337 A | 3/2018 |
| CN | 108256539 A | 7/2018 |

(Continued)

OTHER PUBLICATIONS

Devlin et al. "BERT: Pre-training of Deep Bidirectional Transformers for Language Understanding" (https://arxiv.org/abs/1810.04805). (Year: 2018).*

(Continued)

*Primary Examiner* — Pierre Louis Desir
*Assistant Examiner* — Keisha Y. Castillo-Torres
(74) *Attorney, Agent, or Firm* — Knobbe, Martens, Olson & Bear, LLP

(57) ABSTRACT

A method and an apparatus for processing information are provided. The method can include: acquiring a word sequence obtained by performing word segmentation on two paragraphs in a text; inputting the word sequence into a to-be-trained natural language processing model to generate a word vector corresponding to a word in the word sequence; inputting the word vector into a preset processing layer of the to-be-trained natural language processing model; predicting whether the two paragraphs are adjacent, and a replaced word in the two paragraphs; and acquiring reference information of the two paragraphs, and training the to-be-trained natural language processing model to obtain a trained natural language processing model, based on the prediction result and the reference information.

20 Claims, 5 Drawing Sheets

(58) Field of Classification Search
CPC ........ G06N 3/08; G06N 3/0454; G06N 20/20; G06K 9/6201
See application file for complete search history.

(56) References Cited

FOREIGN PATENT DOCUMENTS

| | | | | |
|---|---|---|---|---|
| CN | 108959260 A | * | 12/2018 | ........... G06F 17/271 |
| CN | 109543039 A | | 3/2019 | |
| CN | 109697291 A | | 4/2019 | |
| CN | 109815333 A | | 5/2019 | |
| CN | 110390023 A | | 10/2019 | |
| CN | 110427609 A | * | 11/2019 | |
| CN | 110427609 A | | 11/2019 | |
| CN | 110427614 A | | 11/2019 | |
| CN | 110489538 A | | 11/2019 | |
| CN | 110489555 A | | 11/2019 | |
| CN | 110633476 A | | 12/2019 | |
| CN | 112307769 A | * | 2/2021 | |
| EP | 3477638 A2 | | 5/2019 | |
| JP | 2017076281 A | | 4/2017 | |
| JP | 2017076281 A | * | 4/2017 | |
| KR | 20210059544 A | * | 5/2021 | |

OTHER PUBLICATIONS

Rietzler, et al., *Adapt or Get Left Behind: Domain Adaptation through BERT Language Model Finetuning for Aspect-Target Sentiment Classification*, DeepOpinion.ai at Innsbruck, Austria (Nov. 19, 2019).

Reimers et al., *Sentence-BERT: Sentence Embeddings using Siamese BERT-Networks*, Ubiquitous Knowledge Processing Lab (UKP-TUDA) Department of Computer Science, Technische Universität Darmstadt (Aug. 27, 2019).

Sunayama, et al., "Document Stream Extraction using Sub-Story Model", Faculty of Information Sciences, Hiroshima City University. 2004.

Japanese Office Action of Mar. 29, 2022 for Japanese Patent Application No. 2021-003862.

Devlin, et al., "BERT: Pre-training of Deep Bidirectional Transformers for Language Understanding", ARXIV.org, Cornell University Library. Oct. 11, 2018.

Vaswani, et al., "Attention is all you need", ARXIV.org, Cornell University Library, Jun. 12, 2017. pp. 1-15.

Rush, et al., "The Annotated Transformer", Harvard NLP webpage, Apr. 3, 2018.

Extended European Search Report of Oct. 6, 2021 for European Patent Application No. 21151537.4. 11 pages.

Yin et al., "Cross-Lingual Sentenxe Summarization System Based on Contrastive Attention Mechanism", Computer Engineering, May 2020, vol. 26, No. 5.

Irem Burlet et al., "Using short text and Emojis to predict the gender of a texter in Turkish", (UBMK'19) 4th International Conference on Computer Science and Engineering, downloaded 2023, pp. 435-438.

* cited by examiner

METHOD AND APPARATUS FOR PROCESSING INFORMATION

CROSS-REFERENCE TO RELATED APPLICATIONS

This application claims the priority of Chinese Patent Application No. 202010034773.7, titled "METHOD AND APPARATUS FOR PROCESSING INFORMATION," filed on Jan. 14, 2020, the content of which is incorporated herein by reference in its entirety.

TECHNICAL FIELD

Embodiments of the present disclosure relates to the field of computer technology, specifically to the field of Internet technology, and more specifically to a method and an apparatus for processing information.

BACKGROUND

Whether in daily life or at work, a large amount of text is exposed. A text message may contain various information. How to process text information is an urgent technical problem for those skilled in the art.

In the existing technology, if the to-be-processed text information exists in a table, the specified information may be determined through such as the table header, and the row and column information. If the text information is paragraphed, it is generally necessary to use a natural language processing model to process the text. Since training the model requires a lot of manpower to label the text manually, it is difficult to generate a sample, and a trained model is generally difficult to be obtained.

SUMMARY

The embodiments of the present disclosure provide a method and an apparatus for processing information.

In a first aspect, an embodiment of the present disclosure provides a method for processing information, including: acquiring a word sequence obtained by performing word segmentation on two paragraphs in a text, where the word sequence includes at least one specified identifier for replacing a word; inputting the word sequence into a to-be-trained natural language processing model to generate a word vector corresponding to a word in the word sequence, where the word vector is used to represent the word in the word sequence and a position of the word; inputting the word vector into a preset processing layer of the to-be-trained natural language processing model, where the preset processing layer includes an encoder and a decoder; predicting whether the two paragraphs are adjacent, and a replaced word in the two paragraphs, to obtain a prediction result, based on a processing result output by the preset processing layer; and acquiring reference information of the two paragraphs, and training the to-be-trained natural language processing model to obtain a trained natural language processing model, based on the prediction result and the reference information, where the reference information includes adjacent information indicating whether the two paragraphs are adjacent, and the replaced word.

In some embodiments, the method further includes: acquiring first sample information, where the first sample information includes a first paragraph word sequence obtained by performing word segmentation on a first target paragraph, and a first specified attribute; inputting the first sample information into the trained natural language processing model to predict correlation information, where the correlation information is used to indicate a correlation between the first paragraph word sequence and the first specified attribute; and training the trained natural language processing model to obtain a first model, based on predicted correlation information and correlation information for labeling the first sample information.

In some embodiments, the method further includes: acquiring second sample information, where the second sample information includes a second paragraph word sequence obtained by performing word segmentation on a second target paragraph, and a second specified attribute, where an attribute matching the second specified attribute is included in the second paragraph word sequence, and the attribute matching the second specified attribute completely matches or partially matches the second specified attribute; inputting the second sample information into the trained natural language processing model, and predicting an attribute value of the second specified attribute in the second paragraph word sequence; and training the trained natural language model to obtain a second model, based on an predicted attribute value and an attribute value for labeling the attribute matching the second specified attribute.

In some embodiments, the predicting an attribute value of the second specified attribute in the second paragraph word sequence, includes: predicting position information of the attribute value of the second specified attribute in the second paragraph word sequence, where the position information includes start position information and end position information.

In some embodiments, the method further includes: acquiring a text word sequence obtained by performing word segmentation on a target text, and dividing the text word sequence into a plurality of paragraph word sequences; determining paragraph word sequences related to a target attribute from the plurality of paragraph word sequences; inputting the target attribute and the paragraph word sequences related to the target attribute into the first model, and predicting correlation information between the target attribute and each of the paragraph word sequences related to the target attribute, where the correlation information includes a correlation value; selecting a preset number of paragraph word sequence from the plurality of paragraph word sequences related to the target attribute in a descending order of the correlation values; inputting the target attribute and the preset number of paragraph word sequence into the second model, and predicting an attribute value of the target attribute and a confidence level of the attribute value of the target attribute; and determining an attribute value of the target attribute from the predicted attribute value of the target attribute, based on the correlation value and the confidence level.

In some embodiments, the determining an attribute value of the target attribute from the predicted attribute value of the target attribute, based on the correlation value and the confidence level, includes: determining, for each of the predicted attribute value of the target attribute, a product of a correlation value between a paragraph word sequence in which the attribute value is located and the target attribute, and a confidence level of the attribute value; and determining an attribute value corresponding to the maximum product from the predicted attribute value of the target attribute as the attribute value of the target attribute.

In some embodiments, the determining a paragraph word sequence related to a target attribute from the plurality of paragraph word sequences, includes: determining, for each paragraph word sequence of the plurality of paragraph word sequences, whether a word matching the target attribute is included in the paragraph word sequence; and determining the paragraph word sequence as the paragraph word sequence related to the target attribute, if the word matching the target attribute is included in the paragraph word sequence.

In some embodiments, the inputting the word sequence into a to-be-trained natural language processing model to generate a word vector corresponding to a word in the word sequence, includes: inputting the word sequence into an embedding layer of the to-be-trained natural language processing model; converting, for the word in the word sequence, the word into an identifier of the word through the embedding layer, and converting the identifier of the word into a first vector; converting position information of the word in the word sequence into a second vector through the embedding layer; determining paragraph position information indicating a paragraph in which the word is located in the two paragraphs through the embedding layer, and converting the paragraph position information into a third vector; and splicing the first vector, the second vector, and the third vector to obtain a word vector corresponding to the word.

In some embodiments, the preset processing layer includes a plurality of cascaded preset processing layers; and the inputting the word vector into a preset processing layer of the to-be-trained natural language processing model, includes: inputting the word vector into a first preset processing layer of the plurality of cascaded preset processing layers.

In some embodiments, the preset processing layer includes a plurality of processing units including the encoder and the decoder; in the plurality of cascaded preset processing layers, a result of each processing unit of a previous preset processing layer is input into processing units of a posterior preset processing layer.

In a second aspect, an embodiment of the present disclosure provides an apparatus for processing information, including: a first acquisition unit, configured to acquire a word sequence obtained by performing word segmentation on two paragraphs in a text, where the word sequence includes at least one specified identifier for replacing a word; a generation unit, configured to input the word sequence into a to-be-trained natural language processing model to generate a word vector corresponding to a word in the word sequence, where the word vector is used to represent the word in the word sequence and a position of the word; an input unit, configured to input the word vector into a preset processing layer of the to-be-trained natural language processing model, where the preset processing layer includes an encoder and a decoder; a prediction unit, configured to predict whether the two paragraphs are adjacent, and a replaced word in the two paragraphs, to obtain a prediction result, based on a processing result output by the preset processing layer; and a first training unit, configured to acquire reference information of the two paragraphs, and train the to-be-trained natural language processing model to obtain a trained natural language processing model, based on the prediction result and the reference information, where the reference information includes adjacent information indicating whether the two paragraphs are adjacent, and the replaced word.

In some embodiments, the apparatus further includes: a second acquisition unit, configured to acquire first sample information, where the first sample information includes a first paragraph word sequence obtained by performing word segmentation on a first target paragraph, and a first specified attribute; an information prediction unit, configured to input the first sample information into the trained natural language processing model to predict correlation information, where the correlation information is used to indicate a correlation between the first paragraph word sequence and the first specified attribute; and a second training unit, configured to train the trained natural language processing model to obtain a first model, based on predicted correlation information and correlation information for labeling the first sample information.

In some embodiments, the apparatus further includes: a third acquisition unit, configured to acquire second sample information, where the second sample information includes a second paragraph word sequence obtained by performing word segmentation on a second target paragraph, and a second specified attribute, where an attribute matching the second specified attribute is included in the second paragraph word sequence, and the attribute matching the second specified attribute completely matches or partially matches the second specified attribute; an attribute value prediction unit, configured to input the second sample information into the trained natural language processing model, and predict an attribute value of the second specified attribute in the second paragraph word sequence; and a third training unit, configured to train the trained natural language model to obtain a second model, based on an predicted attribute value and an attribute value for labeling the attribute matching the second specified attribute.

In some embodiments, the apparatus further includes: a dividing unit, configured to acquire a text word sequence obtained by performing word segmentation on a target text, and divide the text word sequence into a plurality of paragraph word sequences; a determination unit, configured to determine paragraph word sequences related to a target attribute from the plurality of paragraph word sequences; a correlation prediction unit, configured to input the target attribute and the paragraph word sequences related to the target attribute into the first model, and predict correlation information between the target attribute and each of the paragraph word sequences related to the target attribute, wherein the correlation information comprises a correlation value; a selection unit, configured to select a preset number of paragraph word sequence from the plurality of paragraph word sequences related to the target attribute in a descending order of the correlation values; an attribute value prediction unit, configured to input the target attribute and the preset number of paragraph word sequence into the second model, and predict an attribute value of the target attribute and a confidence level of the attribute value of the target attribute; and an attribute value determination unit, configured to determine an attribute value of the target attribute from the predicted attribute value of the target attribute, based on the correlation value and the confidence level.

In some embodiments, the attribute value prediction unit is further configured to predict an attribute value of the second specified attribute in the second paragraph word sequence by: predicting position information of the attribute value of the second specified attribute in the second paragraph word sequence, where the position information includes start position information and end position information.

In some embodiments, the attribute value determination unit is further configured to determine the attribute value of the target attribute from the predicted attribute value of the target attribute, based on the correlation value and the confidence level, by determining, for each of the predicted attribute value of the target attribute, a product of a correlation value between a paragraph word sequence in which the each attribute value is located and the target attribute, and a confidence level of the attribute value; and determining an attribute value corresponding to a maximum product from the predicted attribute value of the target attribute as the attribute value of the target attribute.

In some embodiments, the determining a paragraph word sequence related to a target attribute from the plurality of paragraph word sequences, includes: determining, for each paragraph word sequence of the plurality of paragraph word sequences, whether a word matching the target attribute is included in the paragraph word sequence; and determining the paragraph word sequence as the paragraph word sequence related to the target attribute, if the word matching the target attribute is included in the paragraph word sequence.

In some embodiments, the generation unit is configured to input the word sequence into the to-be-trained natural language processing model to generate the word vector corresponding to the word in the word sequence, by: inputting the word sequence into an embedding layer of the to-be-trained natural language processing model; converting, for the word in the word sequence, the word into an identifier of the word through the embedding layer, and converting the identifier of the word into a first vector; converting position information of the word in the word sequence into a second vector through the embedding layer; determining paragraph position information indicating a paragraph in which the word is located in the two paragraphs through the embedding layer, and converting the paragraph position information into a third vector; and splicing the first vector, the second vector, and the third vector to obtain a word vector corresponding to the word.

In some embodiments, the preset processing layer includes a plurality of cascaded preset processing layers; and the input unit configured to input the word vector into the preset processing layer of the to-be-trained natural language processing model, by: inputting the word vector into a first preset processing layer of the plurality of cascaded preset processing layers.

In some embodiments, the preset processing layer includes a plurality of processing units including the encoder and the decoder; in the plurality of cascaded preset processing layers, a result of each processing unit of a previous preset processing layer is input into processing units of a posterior preset processing layer.

In a third aspect, an embodiment of the present disclosure provides an electronic device, including: one or more processors; and a storage device for storing one or more programs, and the one or more programs, when executed by the one or more processors, cause the one or more processors to implement the method as described in any one of the embodiments of the method for processing information.

In a fourth aspect, an embodiment of the present disclosure provides a computer readable storage medium storing a computer program, and the computer program, when executed by a processor, implements the method as described in any one of the embodiments of the method for processing information.

According to the solution for processing information provided by some embodiments of the present disclosure, a word sequence obtained by performing word segmentation on two paragraphs in a text is first acquired, where the word sequence includes at least one specified identifier for replacing a word; the word sequence is input into a to-be-trained natural language processing model to generate a word vector corresponding to a word in the word sequence, where the word vector is used to represent the word in the word sequence and a position of the word; then, the word vector is input into a preset processing layer of the to-be-trained natural language processing model, where the preset processing layer includes an encoder and a decoder; whether the two paragraphs are adjacent, and a replaced word in the two paragraphs, are predicted to obtain a prediction result, based on a processing result output by the preset processing layer; and finally, reference information of the two paragraphs is acquired, and the to-be-trained natural language processing model is trained to obtain a trained natural language processing model, based on the prediction result and the reference information, where the reference information includes adjacent information indicating whether the two paragraphs are adjacent, and the replaced word.

BRIEF DESCRIPTION OF THE DRAWINGS

After reading the detailed descriptions of non-limiting embodiments with reference to the following accompanying drawings, other features, objectives and advantages of the present disclosure will be more apparent.

DETAILED DESCRIPTION OF EMBODIMENTS

The present disclosure will be described below in detail with reference to the accompanying drawings and in combination with the embodiments. It should be appreciated that the specific embodiments described herein are merely used for explaining the relevant features, rather than limiting the features. In addition, it should be noted that, for the ease of description, only the parts related to the relevant features are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

The method provided in embodiments of the present disclosure may use a large number of samples without manual labeling to train a natural language processing model, so that the problem of insufficient samples may be solved and the prediction accuracy of the model may be improved, while the manpower consumption is reduced.

Figure 1:
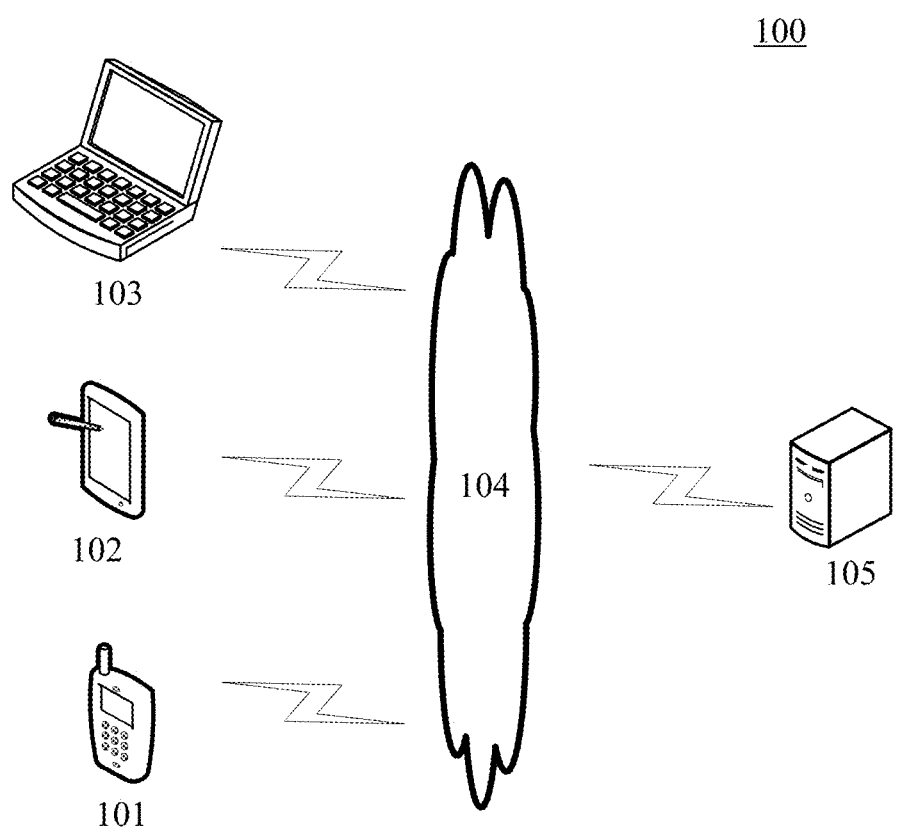
FIG. 1 is an example system architecture diagram in which some embodiments of the present disclosure may be applied.

FIG. 1 shows an example system architecture diagram 100 of an embodiment in which a method or an apparatus for processing information according to the present disclosure may be applied.

As shown in FIG. 1, the system architecture 100 may include terminal devices 101, 102 and 103, network 104, and a server 105. The network 104 serves as a medium providing a communication link between the terminal devices 101, 102 and 103 and the server 105. The network 104 may include various types of connections, such as, wired or wireless communication links, or optical fiber cables.

A user may use the terminal devices 101, 102 and 103 to interact with the server 105 through the network 104 to receive or send messages. Various communication client applications, such as, a document reading application, a video type application, a live broadcast application, an instant messaging tool, a mailbox client, and social platform software, may be installed on the terminal devices 101, 102 and 103.

The terminal devices 101, 102, 103 may be hardware or software. When the terminal devices 101, 102, 103 are hardware, the terminal devices 101, 102, 103 may be various electronic devices having display screens, including but not limited to, a smart phone, a tablet computer, an electronic book reader, a laptop computer and a desktop computer. When the terminal devices 101, 102, 103 are software, the terminal devices 101, 102, 103 may be installed in the electronic device. The terminal devices 101, 102, 103 may be implemented as a plurality of software pieces or software modules, or as a single software piece or software module, which is not specifically limited herein.

The server 105 may be a server providing various services, such as a background server providing support to the terminal devices 101, 102, 103. The background server may execute a process, such as analysis on the received data such as a text, and feed back the processing result (such as the attribute value of the target attribute in the text) to the terminal devices.

It should be noted that the method for processing information provided in the embodiments of the present disclosure may be executed by the server 105 or the terminal devices 101, 102, 103. Correspondingly, the apparatus for processing information may be provided in the server 105 or the terminal devices 101, 102, 103.

It should be appreciated that the numbers of the terminal devices, the network and the server in FIG. 1 are merely illustrative. Any number of terminal devices, networks and servers may be provided based on actual requirements.

Figure 2:
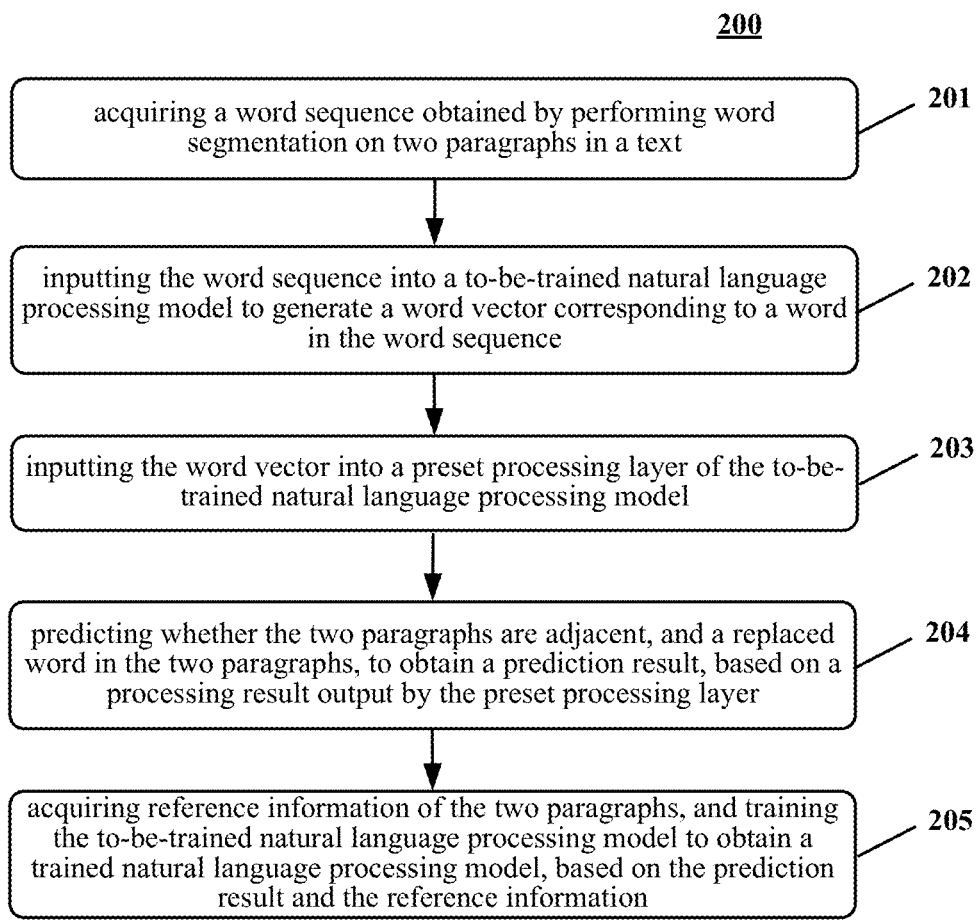
FIG. 2 is a flowchart of an embodiment of a method for processing information according to the present disclosure.

Further referring to FIG. 2, a flow 200 of an embodiment of a method for processing information according to the present disclosure is illustrated. The method includes the following steps 201-205.

Step 201 includes acquiring a word sequence obtained by performing word segmentation on two paragraphs in a text, where the word sequence includes at least one specified identifier for replacing a word.

In this embodiment, the execution body of the method for processing information (such as the server or the terminal devices shown in FIG. 1) may acquire the word sequence corresponding to the two paragraphs in a text from the local or other execution body. Specifically, the execution body or other execution body may perform word segmentation on the two paragraphs in the text to generate an initial word sequence, and then replace at least one word in the initial word sequence with a specified identifier, thereby generating the word sequence. The specified identifier herein may mask the replaced words and thus may be used to train the natural language processing model to predict missing words based on context. A specific character may be used to connect respective words sequences of the two paragraphs.

Step 202 includes inputting the word sequence into a to-be-trained natural language processing model to generate a word vector corresponding to a word in the word sequence, where the word vector is used to represent the word in the word sequence and a position of the word.

In this embodiment, the execution body may input the word sequence into the to-be-trained natural language processing model, thereby using the natural language processing model to generate the word vector corresponding to each word in the word sequence. The position of the word herein may be the position of the word in the word sequence, such as sequencing, or the paragraph where the word is located. For example, the natural language processing model herein may be a word embedding model such as seq2seq models or word2vec.

In practice, the execution body may generate the word vector that represents both the word itself and the position of the word in various ways. For example, the execution body may determine the position information corresponding to the position of the word in the word sequence, and determine the vector corresponding to the position information. In addition, the execution body may determine the vector corresponding to the word. Then, the execution body may splice the two vectors to obtain the word vector.

In some alternative implementations of this embodiment, the step 202 may include: inputting the word sequence into an embedding layer of the to-be-trained natural language processing model; converting, for the word in the word sequence, the word into an identifier of the word through the embedding layer, and converting the identifier of the word into a first vector; converting position information of the word in the word sequence into a second vector through the embedding layer; determining paragraph position information indicating a paragraph where the word is located in the two paragraphs through the embedding layer, and converting the paragraph position information into a third vector; and splicing the first vector, the second vector, and the third vector to obtain a word vector corresponding to the word.

In these alternative implementations, the execution body may use the embedding layer to generate the word vector. Specifically, for the word in the word sequence (such as each word in the word sequence), the execution body may look up the identifier corresponding to the word in a word list in the embedding layer. Then, the execution body may convert the identifier of the word into a vector, and use the vector as the first vector. In addition, the execution body may convert the position information of the word in the word sequence into a vector in the embedding layer, and use the vector as the second vector. Also, the execution body may determine, in the embedding layer, the paragraph where the word is located in the two paragraphs, that is, the paragraph position information. Specifically, a specified character may be used as the paragraph position information to indicate the paragraph where the word is located, for example, an EA may be used to indicate that the word is located in the first paragraph in two paragraphs, and an EB may be used to indicate that the word is located in the second paragraph, where both the EA and the EB are the paragraph position information. Thereafter, the execution body may convert the paragraph position information into a vector, and use the vector as a third vector. Specifically, the vectors obtained by the three transformations may be low-dimensional vectors. Then, the execution body may splice the obtained first vector, second vector, and third vector to obtain the word vector corresponding to the word.

The word vectors in these implementations may represent the word, the position information of the word in the word sequence, and the paragraph where the word is located, so that various properties of the word may be accurately and comprehensively expressed by the word vectors.

Step 203 includes inputting the word vector into a preset processing layer of the to-be-trained natural language processing model, where the preset processing layer includes an encoder and a decoder.

In this embodiment, the execution body may input the word vector to the preset processing layer of the to-be-trained natural language processing model. The preset processing layer herein may include the encoder and the decoder. The execution body may use the encoder to read an input word vector and encode it into an intermediate representation. Then, the execution body may use the decoder to further process the intermediate representation and output the processed word vector.

In some alternative implementations of this embodiment, the preset processing layer includes a plurality of cascaded preset processing layers; and the step 203 may include inputting the word vector into a first preset processing layer of the plurality of cascaded preset processing layers.

In these alternative implementations, the natural language processing model may include a plurality of preset processing layers, which may be cascaded. That is, the result of the previous preset processing layer is input to the posterior preset processing layer. The execution body may input the word vector to the first preset processing layer, so that the first preset processing layer transfers the result to the posterior preset processing layer after processing, and the posterior preset processing layer may execute processing based on the result of the first preset processing layer, and so on until the last preset processing layer is processed.

These implementations may use the plurality of cascaded preset processing layers to execute multi-step processing, thereby improving the accuracy of the processing.

In some alternative implementations of this embodiment, the preset processing layer includes a plurality of processing units including an encoder and a decoder. In the plurality of cascaded preset processing layers, the result of each processing unit of the previous preset processing layer is input to processing units of the posterior preset processing layer.

In these alternative implementations, each preset processing layer may include a plurality of processing units, for example, the processing units herein may be transformer units. Each processing unit may include an encoder and a decoder, for example, may include six encoders and six decoders. The result of each processing unit in the previous preset processing layer may be input to all the processing units of the posterior preset processing layer.

In these implementations, each processing unit of the posterior preset processing layer may obtain the results of all the processing units of the previous preset processing layer, so that the respective results may be comprehensively fused.

Step 204 includes predicting whether the two paragraphs are adjacent, and a replaced word in the two paragraphs, to obtain a prediction result, based on a processing result output by the preset processing layer.

In this embodiment, the execution body may use the processing result output by the preset processing layer in the natural language processing model to predict whether the two paragraphs are adjacent in the text, thereby predicting adjacent information indicating whether the two paragraphs are adjacent, and may predict which word is replaced with the specified identifier.

Step 205 includes acquiring reference information of the two paragraphs, and training the to-be-trained natural language processing model to obtain a trained natural language processing model, based on the prediction result and the reference information, where the reference information includes adjacent information indicating whether the two paragraphs are adjacent or not, and the replaced word.

In this embodiment, the execution body may acquire the reference information of the two paragraphs, and train the to-be-trained natural language processing model based on the prediction result obtained by the prediction and the reference information. Specifically, the reference information is real data present in the text. Whether the two paragraphs are adjacent and which word is replaced are objective, thus the reference information may be obtained without manual labeling. The execution body may use the preset loss function, the reference information and the prediction result, to calculate the loss value. In practice, the loss value may be the sum of two sub-loss values, where the one sub-loss value thereof corresponds to the adjacent information and the other sub-loss value thereof corresponds to the replaced word.

The method provided in the embodiment of the present disclosure may use a large number of samples without manual labeling to train a natural language processing model, so that the problem of insufficient samples may be solved and the prediction accuracy of the model may be improved, while the manpower consumption is reduced.

In some alternative implementations of this embodiment, the method may further include: acquiring second sample information, where the second sample information includes a second paragraph word sequence obtained by performing word segmentation on a second target paragraph, and a second specified attribute, where an attribute matching the second specified attribute is included in the second paragraph word sequence, where the attribute matching the second specified attribute completely or partially matches the second specified attribute; inputting the second sample information into the trained natural language processing model, and predicting an attribute value of the second specified attribute in the second paragraph word sequence; and training the trained natural language model to obtain a second model, based on an predicted attribute value and the attribute value for labeling the attribute completely matching or partially matching the second specified attribute.

In these alternative implementations, the execution body may acquire the second sample information and input the second sample information into the trained natural language processing model, thereby using the trained natural language processing model to predict the attribute value of the second specified attribute in the second paragraph word sequence.

In practice, the attribute matching the second specified attribute in the second paragraph word sequence may completely match or partially match the second specified attribute. For example, the second specified attribute may be "an issue date", and if the attribute completely matches the second specified attribute, the attribute may be "an issue date". Otherwise, if the attribute partially matches the second specified attribute, the attribute may be "issued on XX".

These implementations may train the model to accurately predict the attribute values. By using the complete match and the partial match, not only the attribute values may be found when the attributes are same, but also the attribute values may be found when the meanings of the attributes are same but the expressions are different, thereby improving the recall rate of prediction.

Figure 3:
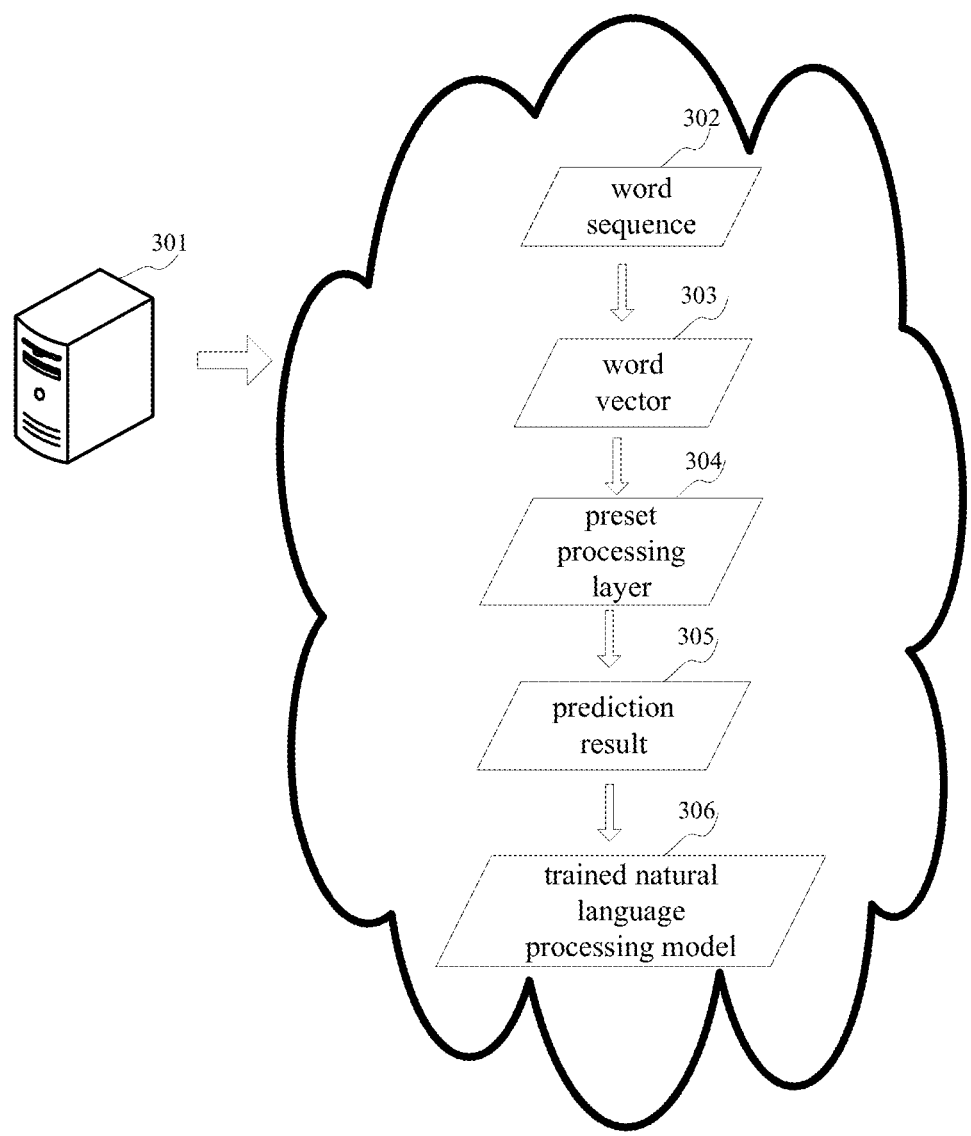
FIG. 3 is a schematic diagram of an application scenario of a method for processing information according to some embodiments of the present disclosure.

Further referring to FIG. 3, FIG. 3 is a schematic diagram of an application scenario of a method for processing information according to some embodiments of the present disclosure. In the application scenario of FIG. 3, the execution body 301 may acquire a word sequence 302, such as "an issuer: Company sep in city A issues a total amount of no more than RMB 500 million Yuan mask" obtained by performing word segmentation on two paragraphs in a text, where the word sequence includes at least one specified identifier "mask" for replacing a word; inputting the word sequence into a to-be-trained natural language processing model to generate a word vector 303 corresponding to a word in the word sequence, where the word vector is used to represent the word in the word sequence and a position of the word; inputting the word vector into a preset processing layer 304 of the to-be-trained natural language processing model, where the preset processing layer includes an encoder and a decoder; predicting whether the two paragraphs are adjacent or not, and a replaced word in the two paragraphs, to obtain a prediction result 305, based on a processing result output by the preset processing layer; and acquiring reference information of the two paragraphs, and training the to-be-trained natural language processing model to obtain a trained natural language processing model 306, based on the prediction result and the reference information, where the reference information includes adjacent information indicating whether the two paragraphs are adjacent or not, and the replaced word.

Figure 4:
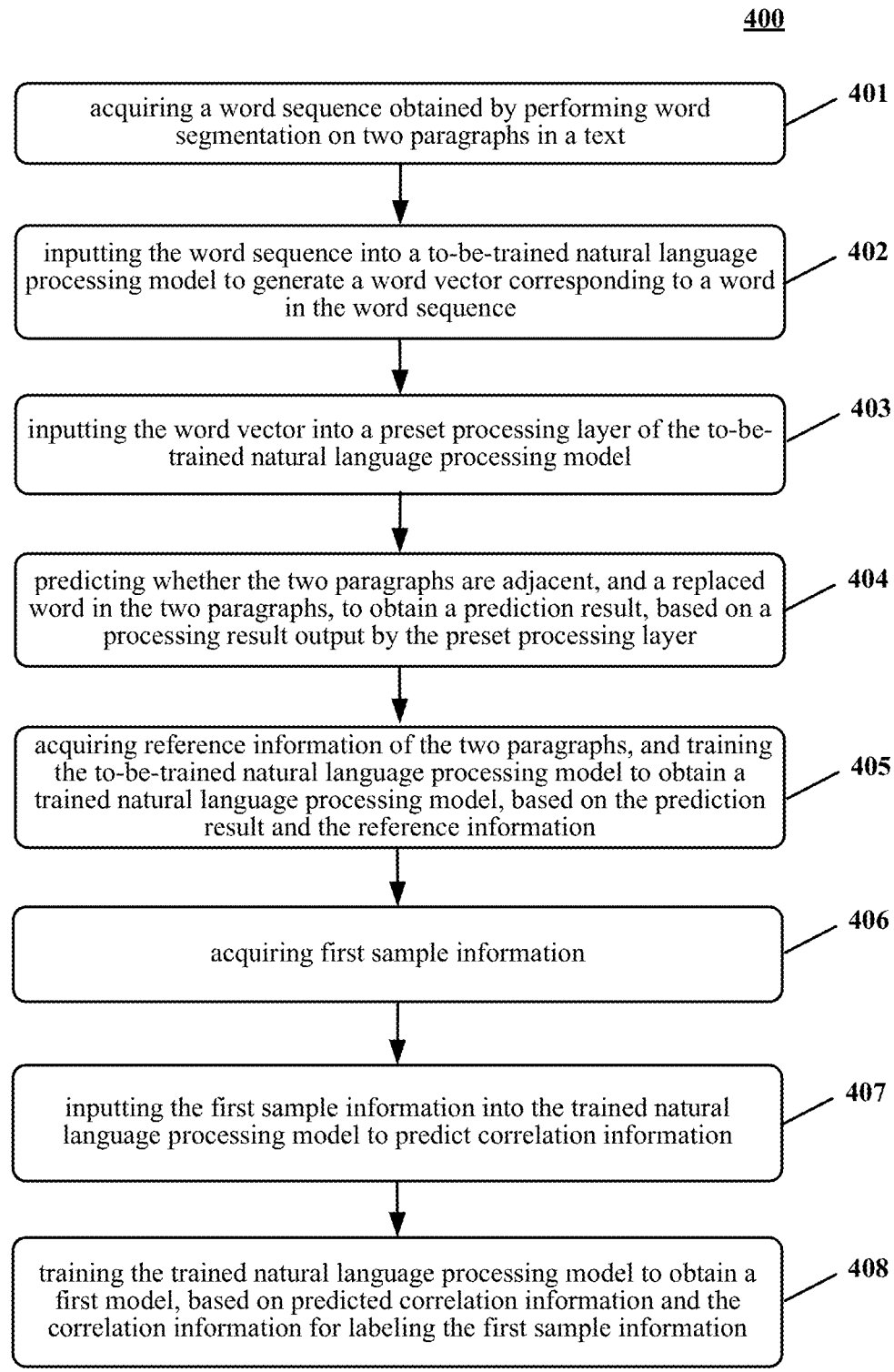
FIG. 4 is a flowchart of yet another embodiment of a method for processing information according to the present disclosure.

Further referring to FIG. 4, yet another flow 400 of an embodiment of a method for processing information according to the present disclosure is illustrated. The flow 400 of the method for processing information includes the following steps 401-408.

Step 401 includes acquiring a word sequence obtained by performing word segmentation on two paragraphs in a text, where the word sequence includes at least one specified identifier for replacing a word.

In this embodiment, the execution body of the method for processing information (such as the server or the terminal devices shown in FIG. 1) may acquire the word sequence corresponding to the two paragraphs in a text from the local or other execution body. Specifically, the execution body or other execution body may perform the word segmentation on the two paragraphs in the text to generate an initial word sequence, and then replace at least one word in the initial word sequence with a specified identifier, thereby generating the word sequence. The specified identifier herein may mask the replaced word and thus may be used to train the natural language processing model to predict a missing word based on context. A specific character may be used to connect respective word sequences of the two paragraphs.

Step 402 includes inputting the word sequence into a to-be-trained natural language processing model to generate a word vector corresponding to a word in the word sequence, where the word vector is used to represent the word in the word sequence and a position of the word.

In this embodiment, the execution body may input the word sequence into the to-be-trained natural language processing model, thereby using the natural language processing model to generate the word vector corresponding to each word in the word sequence. The position of the word herein may be the position of the word in the word sequence, such as sequencing, or the paragraph where the word is located.

Step 403 includes inputting the word vector into a preset processing layer of the to-be-trained natural language processing model, where the preset processing layer includes an encoder and a decoder.

In this embodiment, the execution body may input the word vector to the preset processing layer of the to-be-trained natural language processing model. The preset processing layer herein may include the encoder and the decoder. The execution body may use the encoder to read an input word vector and encode it into an intermediate representation. Then, the execution body may use the decoder to further process the intermediate representation and output the processed word vector.

Step 404 includes predicting whether the two paragraphs are adjacent, and a replaced word in the two paragraphs, to obtain a prediction result, based on a processing result output by the preset processing layer.

In this embodiment, the execution body may use the processing result output by the preset processing layer in the natural language processing model to predict whether the two paragraphs are adjacent in the text, thereby predicting adjacent information indicating whether the two paragraphs are adjacent, and may predict which word is replaced with the specified identifier.

Step 405 includes acquiring reference information of the two paragraphs, and training the to-be-trained natural language processing model to obtain a trained natural language processing model, based on the prediction result and the reference information, where the reference information includes adjacent information indicating whether the two paragraphs are adjacent or not, and the replaced word.

In this embodiment, the execution body may acquire reference information of the two paragraphs, and train the to-be-trained natural language processing model based on the prediction result obtained by the prediction and the reference information.

Step 406 includes acquiring first sample information, where the first sample information includes a first paragraph word sequence obtained by performing segmentation on a first target paragraph, and a first specified attribute.

In this embodiment, the execution body of the method for processing information (such as the server or the terminal devices shown in FIG. 1) may acquire the first sample information from the local or other electronic device. The first sample information herein may include a first paragraph word sequence corresponding to the first target paragraph, and a first specified attribute. The first target paragraph may include an attribute and an attribute value of the attribute, for example, the attribute is gender and the corresponding attribute value is female. The first specified attribute may or may not be related to the first target paragraph. The paragraph word sequence herein may not include the specified identifier for replacing the word.

Step 407 includes inputting the first sample information into the trained natural language processing model to predict correlation information, where the correlation information is used to indicate a correlation between the first paragraph word sequence and the first specified attribute.

In this embodiment, the execution body may input the first sample information into the trained natural language processing model to predict the correlation information. The correlation information herein is used to indicate the correlation between the first paragraph word sequence and the first specified attribute. For example, the correlation information may be a correlation value for quantifying correlation, or may be specific information for reflecting the correlation levels, e.g., the specific information may indicate such as "correlated", "uncorrelated", or "very correlated", "general correlated" and "not correlated" respectively.

In practice, if the first specified attribute is completely presented in the paragraph, the corresponding correlation value may be the maximum value. If there is an attribute with the same meaning as the first specified attribute in the paragraph, the correlation value may be decreased compared to the maximum value. If there is an attribute with the partially same meaning as the first specified attribute in the paragraph, the correlation value may be decreased compared to the maximum value. If there is no same or similar words as the first specified attribute in the paragraph, the correlation value may be much lower than the maximum value, for example, may be the minimum value.

Step 408 includes training the trained natural language processing model to obtain a first model, based on predicted correlation information and correlation information for labeling the first sample information.

In this embodiment, the execution body may acquire the correlation information for labeling the first sample information. In this case, the execution body may calculate a loss value based on the labeling correlation information and the predicted correlation information to implement the further training of the trained natural language processing model, thereby obtaining the first model.

This embodiment may combine the labeled and unlabeled samples to execute a comprehensive training, thereby further improving the accuracy of the model.

In some alternative implementations of this embodiment, the method may further include: acquiring second sample information, where the second sample information includes a second paragraph word sequence obtained by performing word segmentation on a second target paragraph, and a second specified attribute, where an attribute matching the second specified attribute is included in the second paragraph word sequence, and the attribute matching the second specified attribute completely or partially matches the second specified attribute; inputting the second sample information into the trained natural language processing model, and predicting an attribute value of the second specified attribute in the second paragraph word sequence; and training the trained natural language model to obtain a second model, based on an predicted attribute value and an attribute value for labeling the attribute matching the second specified attribute.

In these alternative implementations, the execution body may acquire the second sample information and input the second sample information into the trained natural language processing model, thereby using the trained natural language processing model to predict the attribute value of the second specified attribute in the second paragraph word sequence.

In practice, the attribute matching the second specified attribute in the second paragraph word sequence may completely match or partially match the second specified attribute. For example, the second specified attribute may be "an issue date", and if the attribute completely matches the second specified attribute, the attribute may be "an issue date". If the attribute partially matches the second specified attribute, the attribute may be "issued on XX".

It should be noted that the acquired samples for training the trained natural language model to obtain the first model and the second model, may be completely same or partially same, and thus, "the first sample information" and "the second sample information", "the first target paragraph" and "the second target paragraph", "the first specified attribute" and "the second specified attribute" and "the first paragraph word sequence" and "the second paragraph word sequence" may be completely same.

These implementations may train the model to accurately predict the attribute values. By using the complete match and the partial match, not only the attribute values may be found when the attributes are same, but also the attribute values may be found when the meanings of the attributes are same but the expressions are different, thereby improving the recall rate of prediction.

In some alternative application scenarios of these implementations, the predicting an attribute value of the second specified attribute in the second paragraph word sequence, may include: predicting position information of the attribute value of the second specified attribute in the second paragraph word sequence, where the position information includes start position information and end position information.

In these alternative application scenarios, the predicted value may represent the position information in the paragraph word sequence. For example, the word sequence corresponding to the attribute value is "no more than RMB 500 million Yuan", and the execution body may label "no" and "Yuan" as the start position and the end position, and use the information for labeling the two position as the start position information and the end position information.

These application scenarios may use the start position information and the end position information to accurately represent the attribute value by using little information.

In some alternative application scenarios of these implementations, the method may further include: acquiring a text word sequence obtained by performing word segmentation on a target text, and dividing the text word sequence into a plurality of paragraph word sequences; determining paragraph word sequences associated with a target attribute from the plurality of paragraph word sequences; inputting the target attribute and the determined paragraph word sequences into the first model, and predicting correlation information between the target attribute and each of the determined paragraph word sequences, where the correlation information includes a correlation value; selecting a preset number of paragraph word sequence from the determined paragraph word sequences in a descending order of the correlation values; inputting the target attribute and the preset number of paragraph word sequence into the second model, and predicting an attribute value of the target attribute and a confidence level of the attribute value of the target attribute for the preset number of paragraph word sequence; and determining an attribute value of the target attribute from the predicted attribute value of the target attribute, based on the correlation value and the confidence level.

In these alternative application scenarios, after obtaining the first model and the second model by training, the execution body may use the two models to predict the attribute value of the target attribute in the text. Specifically, the execution body may acquire the word sequence corresponding to the target text as the text word sequence, and divide the text word sequence into a plurality of paragraph word sequences according to the segmentation granularity of the paragraphs. Each paragraph word sequence corresponds to a paragraph in the target text. Then, the execution body may execute an initial screening on the plurality of paragraph word sequences, filter out the paragraph word sequences completely unrelated to the target attribute, and determine the paragraph word sequences related to the target attribute.

Then, the execution body may input the target attribute and the determined paragraph word sequences into the first model, in order to use the first model to predict the correlation information between the target attribute and each of the determined paragraph word sequences (in the initial screening). The correlation information herein may be a correlation value, and a larger value indicates a larger correlation. Thereafter, the execution body may select a preset number of paragraph word sequence from the plurality of determined paragraph word sequences in a descending order of the correlation values. For example, in the determined paragraph word sequences, the paragraph word sequences with top 3 correlation values are selected. Specifically, the selecting step may be executed by the execution body in the first model, or may be executed outside the first model.

Then, the execution body may input the target attribute and the preset number of paragraph word sequence into the second model, thereby using the second model to predicting the attribute value of the target attribute and the confidence level of the attribute value from the preset number of paragraph word sequence.

After obtaining the output correlation values from the first model and the output confidence levels from the second model, the execution body may determine the attribute value of the target attribute from the predicted attribute values of the target attribute based on the correlation values and the confidence levels.

In practice, the execution body may determine the attribute value based on the correlation values and the confidence levels in various ways. For example, the execution body may directly obtain the correlation values between the target attribute and the paragraph word sequence where the attribute value is located for each of predicted attribute values of the target attribute. The correlation values obtained herein are previously predicted by the execution body using the first model. Then, the sum of the acquired correlation value and the confidence level of the attribute value is determined. Finally, the attribute value, of which the corresponding sum is maximum, in the predicted attribute values of the target attribute is determined as the attribute value of the target attribute. In addition, the execution body may input the obtained correlation value and the target attribute into a preset model, and the model may represent the corresponding relationship between the combination of the correlation value and the attribute, and the attribute value. In this case, the execution body may obtain the attribute value of the target attribute output by the model.

These application scenarios may use the first model and the second model obtained by training to accurately determine the attribute value, thereby implementing the accurate extraction of the key information.

Alternatively, in the application scenario, the determining an attribute value of the target attribute from predicted attribute values of the target attribute, based on the correlation values and the confidence levels, may include: determining, for each attribute value of the predicted attribute values of the target attribute, a product of a correlation value between a paragraph word sequence where the attribute value is located and the target attribute, and a confidence level of the attribute value; and determining an attribute value corresponding to a maximum product from the predicted attribute values of the target attribute as the attribute value of the target attribute.

In these alternative application scenarios, the execution body may determine the product of the correlation value and the confidence level corresponding to the attribute value. Then, the execution body may determine the maximum product, and use the attribute value corresponding to the confidence level used in calculating the maximum product as the attribute value of the target attribute.

These alternative application scenarios may be completely used by multiplying the confidence level with the correlation value to obtain the more accurate attribute value.

Alternatively, the determining a paragraph word sequence related to a target attribute from the plurality of paragraph word sequences, includes: determining, for each of the plurality of paragraph word sequences, whether a word matching the target attribute is included in the paragraph word sequence; and determining the paragraph word sequence as the paragraph word sequence related to the target attribute, if the word matching the target attribute is included in the paragraph word sequence.

In these alternative application scenarios, the execution body may determine whether a word completely matching or partially matching (i.e., matching) the target attribute is included in the plurality of paragraph word sequences. It is determined that the paragraph word sequence is related to the target attribute, if the word matching the target attribute is included in the paragraph word sequence.

In these application scenarios, matching may be used to execute a relatively fast and accurate initial screening of the paragraph word sequence, thereby shortening the prediction time of the subsequent natural language processing model.

Further referring to FIG. 5, as implementations of the methods shown in the above figures, the present disclosure provides an embodiment of an apparatus for processing information corresponding to the embodiment of the method shown in FIG. 2, which may include the same or corresponding features or effects as the embodiment of the method shown in FIG. 2 in addition to the features described below. The apparatus may be specifically applied to various electronic devices.

Figure 5:
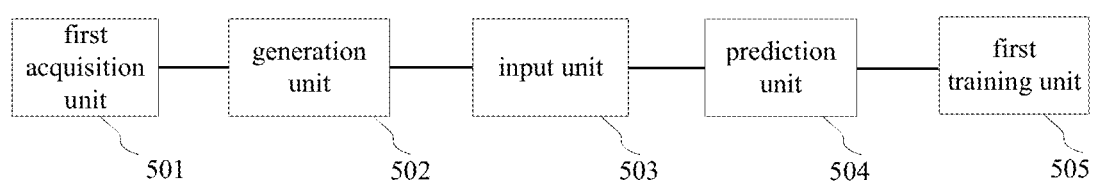
FIG. 5 is a schematic structural diagram of an embodiment of an apparatus for processing information according to the present disclosure.

As shown in FIG. 5, an apparatus 500 for processing information of this embodiment includes: a first acquisition unit 501, a generation unit 502, an input unit 503, a prediction unit 504 and a first training unit 505. The first acquisition unit 501 is configured to acquire a word sequence obtained by performing word segmentation on two paragraphs in a text, where the word sequence includes at least one specified identifier for replacing a word; the generation unit 502 is configured to input the word sequence into a to-be-trained natural language processing model to generate a word vector corresponding to a word in the word sequence, where the word vector is used to represent the word in the word sequence and a position of the word; the input unit 503 is configured to input the word vector into a preset processing layer of the to-be-trained natural language processing model, where the preset processing layer includes an encoder and a decoder; the prediction unit 504 is configured to predict whether the two paragraphs are adjacent, and a replaced word in the two paragraphs, to obtain a prediction result, based on a processing result output by the preset processing layer; and the first training unit 505 is configured to acquire reference information of the two paragraphs, and train the to-be-trained natural language processing model to obtain a trained natural language processing model, based on the prediction result and the reference information, where the reference information includes adjacent information indicating whether the two paragraphs are adjacent, and the replaced word.

In some embodiments, the first acquisition unit 501 of the apparatus for processing information 500 may acquire the word sequence corresponding to the two paragraphs in a text from the local or other execution body. Specifically, the execution body or other execution body may perform word segmentation on the two paragraphs in the text to generate an initial word sequence, and then replace at least one word in the initial word sequence with a specified identifier, thereby generating the word sequence.

In some embodiments, the generation unit 502 may input the word sequence into the to-be-trained natural language processing model, thereby using the natural language processing model to generate the word vector corresponding to each word in the word sequence. The position of the word herein may be the position of the word in the word sequence, such as sequencing, or the paragraph where the word is located.

In some embodiments, the input unit 503 may input the word vector to the preset processing layer of the to-be-trained natural language processing model. The preset processing layer herein may include the encoder and the decoder. The execution body may use the encoder to read an input word vector and encode it into an intermediate representation. Then, the execution body may use the decoder to further process the intermediate representation and output the processed word vector.

In some embodiments, the prediction unit 504 may use the processing result output by the preset processing layer in the natural language processing model to predict whether the two paragraphs are adjacent in the text, thereby predicting adjacent information indicating whether the two paragraphs are adjacent, and may predict which words are replaced with the specified identifier.

In some embodiments, the first training unit 505 may acquire the reference information of the two paragraphs, and train the to-be-trained natural language processing model based on the prediction result obtained by the prediction and the reference information. Specifically, the reference information is real data present in the text. Whether the two paragraphs are adjacent and which words are replaced are objective, thus the reference information may be obtained without manual labeling.

In some alternative implementations of this embodiment, the apparatus may further include: a second acquisition unit, configured to acquire first sample information, where the first sample information includes a first paragraph word sequence obtained by performing word segmentation on a first target paragraph, and a first specified attribute; an information prediction unit, configured to input the first sample information into the trained natural language processing model to predict correlation information, where the correlation information is used to indicate a correlation between the first paragraph word sequence and the first specified attribute; and a second training unit, configured to train the trained natural language processing model to obtain a first model, based on predicted correlation information and the correlation information for labeling the first sample information.

In some alternative implementations of this embodiment, the apparatus may further include: a third acquisition unit, configured to acquire second sample information, where the second sample information includes a second paragraph word sequence obtained by performing word segmentation on a second target paragraph, and a second specified attribute, where an attribute matching the second specified attribute is included in the second paragraph word sequence, and the attribute matching the second specified attribute completely matches or partially matches the second specified attribute; an attribute value prediction unit, configured to input the second sample information into the trained natural language processing model, and predict an attribute value of the second specified attribute in the second paragraph word sequence; and a third training unit, configured to train the trained natural language model to obtain a second model, based on an predicted attribute value and the attribute value for labeling the attribute matching the second specified attribute.

In some alternative implementations of this embodiment, the apparatus may further include: a dividing unit, configured to acquire a text word sequence obtained by performing word segmentation on a target text, and divide the text word sequence into a plurality of paragraph word sequences; a determination unit, configured to determine paragraph word sequences related to a target attribute from the plurality of paragraph word sequences; a correlation prediction unit, configured to input the target attribute and the determined paragraph word sequences into the first model, and predict correlation information between the target attribute and each of the determined paragraph word sequences, where the correlation information includes a correlation value; a selection unit, configured to select a preset number of paragraph word sequence from the plurality of determined paragraph word sequences in a descending order of the correlation values; an attribute value prediction unit, configured to input the target attribute and the preset number of paragraph word sequence into the second model, and predict, for the preset number of paragraph word sequence, an attribute value of the target attribute and a confidence level of the attribute value of the target attribute; and an attribute value determination unit, configured to determine an attribute value of the target attribute from the predicted attribute value of the target attribute, based on the correlation value and the confidence level.

In some alternative implementations of this embodiment, the attribute value prediction unit is further configured to perform the step of predicting an attribute value of the second specified attribute in the second paragraph word sequence as follows: predicting position information of the attribute value of the second specified attribute in the second paragraph word sequence, where the position information includes start position information and end position information.

In some alternative implementations of this embodiment, the attribute value determination unit is further configured to perform the step of determining an attribute value of the target attribute from the predicted attribute value of the target attribute, based on the correlation values and the confidence levels, as follows: determining, for each attribute value of the predicted attribute value of the target attribute, a product of a correlation value between a paragraph word sequence where the attribute value is located and the target attribute, and a confidence level of the attribute value; and determining an attribute value corresponding to a maximum product from the predicted attribute value of the target attribute as the attribute value of the target attribute.

In some alternative implementations of this embodiment, the determining paragraph word sequences related to a target attribute from the plurality of paragraph word sequences, includes: determining, for each paragraph word sequence of the plurality of determined paragraph word sequences, whether a word matching the target attribute is included in each paragraph word sequence; and determining the paragraph word sequence as the paragraph word sequence related to the target attribute, if the word matching the target attribute is included in the paragraph word sequence.

In some alternative implementations of this embodiment, the generation unit is further configured to perform the step of inputting the word sequence into a to-be-trained natural language processing model to generate a word vector corresponding to a word in the word sequence as follows: inputting the word sequence into an embedding layer of the to-be-trained natural language processing model; converting, for the word in the word sequence, the word into an identifier of the word through the embedding layer, and converting the identifier of the word into a first vector; converting position information of the word in the word sequence into a second vector through the embedding layer; determining paragraph position information indicating a paragraph where the word is located in the two paragraphs through the embedding layer, and converting the paragraph position information into a third vector; and splicing the first vector, the second vector, and the third vector to obtain a word vector corresponding to the word.

In some alternative implementations of this embodiment, the preset processing layer includes a plurality of cascaded preset processing layers; and the input unit is further configured to perform the step of inputting the word vector into a preset processing layer of the to-be-trained natural language processing model as follows: inputting the word vector into a first preset processing layer of the plurality of cascaded preset processing layers.

In some alternative implementations of this embodiment, the preset processing layer includes a plurality of processing units including the encoder and the decoder; in the plurality of cascaded preset processing layers, a result of each processing unit of a previous preset processing layer is input into processing units of a posterior preset processing layer.

Figure 6:
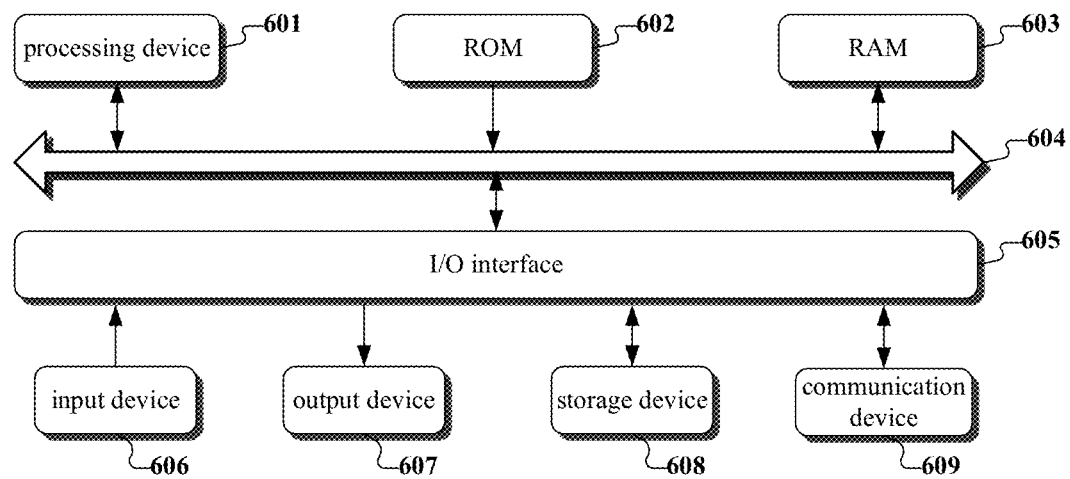
FIG. 6 is a schematic structural diagram of a computer system of an electronic device adapted to implement some embodiments of the present disclosure.

As shown in FIG. 6, the electronic device 600 may include a processing device 601 (such as a central processing unit, or a graphics processing unit), which may execute various appropriate actions and processes in accordance with a program stored in a read-only memory (ROM) 602 or a program loaded into a random access memory (RAM) 603 from a storage portion 608. The RAM 603 also stores various programs and data required by operations of the electronic device 600. The processing device 601, the ROM 602 and the RAM 603 are connected to each other through a bus 604. An input/output (I/O) interface 605 is also connected to the bus 604.

Generally, The following components are connected to the I/O interface 605: an input device 606 including such as a touch screen, a touchpad, a keyboard, a mouse, a camera, a microphone, an accelerometer, a gyroscope; an output device 607 including such as a liquid crystal display (LCD), a speaker, a vibrator; a storage device 608 including such as a magnetic tape, a hard disk; and a communication device 609. The communication device 609 may allow the electronic device 600 to wirelessly or wirelessly communicate with other devices to exchange data. Although FIG. 6 illustrates the electronic device 600 having various devices, it should be appreciated that not all of the illustrated devices are required to be implemented or provided. More or fewer devices may alternatively be implemented or provided. Each block shown in FIG. 6 may represent one device or multiple devices as required.

In particular, according to embodiments of the present disclosure, the process described above with reference to the flowchart may be implemented in a computer software program. For example, an embodiment of the present disclosure includes a computer program product, which includes a computer program that is tangibly embedded in a computer-readable medium. The computer program includes program codes for executing the method as illustrated in the flowchart. In such an embodiment, the computer program may be downloaded and installed from a network through the communication device 609, or may be installed from the storage medium 608 or the ROM 602. The computer program, when executed by the processing device 601, implements the above mentioned functionalities as defined by the methods of some embodiments of the present disclosure. It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include, but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that may be read by computer may be any computer readable medium except for the computer readable storage medium. The computer readable medium is capable of sending, propagating or transmitting programs for use by, or used in combination with, a command execution system, apparatus or element. The program codes contained on the computer readable medium may be transmitted with any suitable medium including, but not limited to: wireless, wired, optical cable, RF medium etc., or any suitable combination of the above.

The flowcharts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present disclosure may be implemented by means of software or hardware. The described units or modules may also be provided in a processor, for example, described as: a processor, including a first acquisition unit, a generation unit, an input unit, a prediction unit and a first training unit, where the names of these units do not in some cases constitute a limitation to such units themselves. For example, the first acquisition unit may also be described as "a unit for acquiring a word sequence obtained by performing word segmentation on two paragraphs in a text".

In another aspect, the present disclosure further provides a computer-readable storage medium. The computer-readable storage medium may be the computer storage medium included in the apparatus in the above described embodiments, or a stand-alone computer-readable storage medium not assembled into the apparatus. The computer-readable storage medium stores one or more programs. The one or more programs, when executed by a device, cause the device to: acquire a word sequence obtained by performing word segmentation on two paragraphs in a text, where the word sequence includes at least one specified identifier for replacing a word; input the word sequence into a to-be-trained natural language processing model to generate a word vector corresponding to a word in the word sequence, where the word vector is used to represent the word in the word sequence and a position of the word; input the word vector into a preset processing layer of the to-be-trained natural language processing model, where the preset processing layer includes an encoder and a decoder; predict whether the two paragraphs are adjacent, and a replaced word in the two paragraphs, to obtain a prediction result, based on a processing result output by the preset processing layer; and acquire reference information of the two paragraphs, and train the to-be-trained natural language processing model to obtain a trained natural language processing model, based on the prediction result and the reference information, where the reference information includes adjacent information indicating whether the two paragraphs are adjacent, and the replaced word.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical solutions formed by the above-described features being interchanged with, but not limited to, technical features with similar functions disclosed in the present disclosure are examples.

What is claimed is:

1. A method for processing information, the method comprising:
    acquiring a word sequence obtained by performing word segmentation on two paragraphs in a text, wherein the word sequence comprises at least one specified identifier for replacing a first word;
    inputting the word sequence into a to-be-trained natural language processing model to generate a word vector corresponding to a second word in the word sequence, wherein the word vector is used to represent the second word in the word sequence and a position of the second word;
    inputting the word vector into a preset processing layer of the to-be-trained natural language processing model, wherein the preset processing layer comprises an encoder and a decoder;
    predicting whether the two paragraphs are adjacent, and the replaced first word in the two paragraphs, to obtain a prediction result, based on a processing result output by the preset processing layer;
    acquiring reference information of the two paragraphs, and training the to-be-trained natural language processing model to obtain a trained natural language processing model, based on the prediction result and the reference information, wherein the reference information comprises adjacent information indicating whether the two paragraphs are adjacent, and the replaced first word;
    acquiring first sample information, wherein the first sample information comprises a first paragraph word sequence obtained by performing word segmentation on a first target paragraph, and a first specified attribute;
    inputting the first sample information comprising the first paragraph word sequence and the first specified attribute into the trained natural language processing model to predict correlation information, wherein the correlation information is used to indicate a correlation value between the first paragraph word sequence and the first specified attribute, and the correlation value is determined by determining whether the first specified attribute or a meaning of the first specified attribute is included in the first paragraph word sequence; and
    training the trained natural language processing model to obtain a first model, based on predicted correlation information and correlation information for labeling the first sample information, wherein a loss value is calculated based on the correlation information for labeling the first sample information and the predicted correlation information to implement further training of the trained natural language processing model.

2. The method according to claim 1, wherein the method further comprises:
    acquiring second sample information, wherein the second sample information comprises a second paragraph word sequence obtained by performing word segmentation on a second target paragraph, and a second specified attribute, wherein an attribute matching the second specified attribute is comprised in the second paragraph word sequence, and the attribute matching the second specified attribute completely matches or partially matches the second specified attribute;
    inputting the second sample information into the trained natural language processing model, and predicting an attribute value of the second specified attribute in the second paragraph word sequence; and
    training the trained natural language processing model to obtain a second model, based on the predicted attribute value and an attribute value for labeling the attribute matching the second specified attribute.

3. The method according to claim 2, wherein the predicting an attribute value of the second specified attribute in the second paragraph word sequence, comprises:
    predicting position information of the attribute value of the second specified attribute in the second paragraph word sequence, wherein the position information comprises start position information and end position information.

4. The method according to claim 2, wherein the method further comprises:
    acquiring a text word sequence obtained by performing word segmentation on a target text, and dividing the text word sequence into a plurality of paragraph word sequences;
    determining paragraph word sequences related to a target attribute from the plurality of paragraph word sequences;
    inputting the target attribute and the paragraph word sequences related to the target attribute into the first model, and predicting correlation information between the target attribute and each of the paragraph word sequences related to the target attribute, wherein the correlation information comprises a correlation value;

selecting a preset number of paragraph word sequence from the plurality of paragraph word sequences related to the target attribute in a descending order of the correlation values;

inputting the target attribute and the preset number of paragraph word sequence into the second model, and predicting an attribute value of the target attribute and a confidence level of the attribute value of the target attribute; and determining an attribute value of the target attribute from the predicted attribute value of the target attribute, based on the correlation value and the confidence level.

5. The method according to claim 4, wherein the determining an attribute value of the target attribute from the predicted attribute value of the target attribute, based on the correlation value and the confidence level, comprises:

determining, for each of the predicted attribute value of the target attribute, a product of a correlation value between a paragraph word sequence where the each attribute value is located and the target attribute, and a confidence level of the each attribute value; and determining an attribute value corresponding to a maximum product from the predicted attribute value of the target attribute as the attribute value of the target attribute.

6. The method according to claim 4, wherein the determining paragraph word sequences related to a target attribute from the plurality of paragraph word sequences, comprises:

determining, for each paragraph word sequence of the plurality of paragraph word sequences, whether a third word matching the target attribute is comprised in the each paragraph word sequence; and determining the each paragraph word sequence as the paragraph word sequence related to the target attribute, if the third word matching the target attribute is comprised in the each paragraph word sequence.

7. The method according to claim 1, wherein the inputting the word sequence into a to-be-trained natural language processing model to generate a word vector corresponding to a second word in the word sequence, comprises:

inputting the word sequence into an embedding layer of the to-be-trained natural language processing model;

converting, for the second word in the word sequence, the second word into an identifier of the second word through the embedding layer, and converting the identifier of the second word into a first vector;

converting position information of the second word in the word sequence into a second vector through the embedding layer;

determining paragraph position information indicating a paragraph in which the second word is located in the two paragraphs through the embedding layer, and converting the paragraph position information into a third vector; and splicing the first vector, the second vector, and the third vector to obtain a word vector corresponding to the second word.

8. The method according to claim 1, wherein the preset processing layer comprises a plurality of cascaded preset processing layers; and the inputting the word vector into a preset processing layer of the to-be-trained natural language processing model, comprises:

inputting the word vector into a first preset processing layer of the plurality of cascaded preset processing layers.

9. The method according to claim 8, wherein:

the preset processing layer comprises a plurality of processing units comprising the encoder and the decoder;

in the plurality of cascaded preset processing layers, a result of each processing unit of a previous preset processing layer is input into processing units of a posterior preset processing layer.

10. The method according to claim 1, wherein the first specified attribute comprises a gender.

11. The method according to claim 1, wherein the correlation value is determined by:

determining a first correlation value in response to determining that the first specified attribute is completely included in the first paragraph word sequence;

determining a second correlation value in response to determining that the meaning of the first specified attribute is included in the first paragraph word sequence;

determining a third correlation value in response to determining that the meaning of the first specified attribute is partially included in the first paragraph word sequence; and determining a fourth correlation value in response to determining that the meaning of the first specified attribute is not included in the first paragraph word sequence, wherein the first correlation value, the second correlation value, the third correlation value and the fourth correlation value are in a decreasing order.

12. An electronic device, comprising:

one or more processors; and a storage device configured to store one or more programs, wherein the one or more programs, when executed by the one or more processors, cause the one or more processors to perform operations comprising:

acquiring a word sequence obtained by performing word segmentation on two paragraphs in a text, wherein the word sequence comprises at least one specified identifier for replacing a first word;

inputting the word sequence into a to-be-trained natural language processing model to generate a word vector corresponding to a second word in the word sequence, wherein the word vector is used to represent the second word in the word sequence and a position of the second word;

inputting the word vector into a preset processing layer of the to-be-trained natural language processing model, wherein the preset processing layer comprises an encoder and a decoder;

predicting whether the two paragraphs are adjacent, and the replaced first word in the two paragraphs, to obtain a prediction result, based on a processing result output by the preset processing layer;

acquiring reference information of the two paragraphs, and training the to-be-trained natural language processing model to obtain a trained natural language processing model, based on the prediction result and the reference information, wherein the reference information comprises adjacent information indicating whether the two paragraphs are adjacent, and the replaced first word;

acquiring first sample information, wherein the first sample information comprises a first paragraph word sequence obtained by performing word segmentation on a first target paragraph, and a first specified attribute;

inputting the first sample information comprising the first paragraph word sequence and the first specified attribute into the trained natural language processing model to predict correlation information, wherein the correlation information is used to indicate a correlation value between the first paragraph word sequence and the first specified attribute, and the correlation value is determined by determining whether the first specified attribute or a meaning of the first specified attribute is included in the first paragraph word sequence; and training the trained natural language processing model to obtain a first model, based on predicted correlation information and correlation information for labeling the first sample information, wherein a loss value is calculated based on the correlation information for labeling the first sample information and the predicted correlation information to implement further training of the trained natural language processing model.

13. The electronic device according to claim 12, wherein the operations further comprise:

acquiring second sample information, wherein the second sample information comprises a second paragraph word sequence obtained by performing word segmentation on a second target paragraph, and a second specified attribute, wherein an attribute matching the second specified attribute is comprised in the second paragraph word sequence, and the attribute matching the second specified attribute completely matches or partially matches the second specified attribute;

inputting the second sample information into the trained natural language processing model, and predicting an attribute value of the second specified attribute in the second paragraph word sequence; and training the trained natural language processing model to obtain a second model, based on the predicted attribute value and an attribute value for labeling the attribute matching the second specified attribute.

14. The electronic device according to claim 13, wherein the predicting an attribute value of the second specified attribute in the second paragraph word sequence, comprises:

predicting position information of the attribute value of the second specified attribute in the second paragraph word sequence, wherein the position information comprises start position information and end position information.

15. The electronic device according to claim 13, wherein the operations further comprise:

acquiring a text word sequence obtained by performing word segmentation on a target text, and dividing the text word sequence into a plurality of paragraph word sequences;

determining paragraph word sequences related to a target attribute from the plurality of paragraph word sequences;

inputting the target attribute and the paragraph word sequences related to the target attribute into the first model, and predicting correlation information between the target attribute and each of the paragraph word sequences related to the target attribute, wherein the correlation information comprises a correlation value;

selecting a preset number of paragraph word sequence from the plurality of paragraph word sequences related to the target attribute in a descending order of the correlation values;

inputting the target attribute and the preset number of paragraph word sequence into the second model, and predicting an attribute value of the target attribute and a confidence level of the attribute value of the target attribute; and determining an attribute value of the target attribute from the predicted attribute value of the target attribute, based on the correlation value and the confidence level.

16. The electronic device according to claim 15, wherein the determining an attribute value of the target attribute from the predicted attribute value of the target attribute, based on the correlation value and the confidence level, comprises:

determining, for each of the predicted attribute value of the target attribute, a product of a correlation value between a paragraph word sequence where the each attribute value is located and the target attribute, and a confidence level of the each attribute value; and determining an attribute value corresponding to a maximum product from the predicted attribute value of the target attribute as the attribute value of the target attribute.

17. The electronic device according to claim 12, wherein the inputting the word sequence into a to-be-trained natural language processing model to generate a word vector corresponding to a second word in the word sequence, comprises:

inputting the word sequence into an embedding layer of the to-be-trained natural language processing model;

converting, for the second word in the word sequence, the second word into an identifier of the second word through the embedding layer, and converting the identifier of the second word into a first vector;

converting position information of the second word in the word sequence into a second vector through the embedding layer;

determining paragraph position information indicating a paragraph in which the second word is located in the two paragraphs through the embedding layer, and converting the paragraph position information into a third vector; and splicing the first vector, the second vector, and the third vector to obtain a word vector corresponding to the second word.

18. The electronic device according to claim 12, wherein the preset processing layer comprises a plurality of cascaded preset processing layers; and the inputting the word vector into a preset processing layer of the to-be-trained natural language processing model, comprises:

inputting the word vector into a first preset processing layer of the plurality of cascaded preset processing layers.

19. The electronic device according to claim 18, wherein:

the preset processing layer comprises a plurality of processing units comprising the encoder and the decoder;

in the plurality of cascaded preset processing layers, a result of each processing unit of a previous preset processing layer is input into processing units of a posterior preset processing layer.

20. A non-transitory computer readable medium storing a computer program, wherein the computer program, when executed by a processor, causes the processor to perform operations comprising:

acquiring a word sequence obtained by performing word segmentation on two paragraphs in a text, wherein the word sequence comprises at least one specified identifier for replacing a first word;

inputting the word sequence into a to-be-trained natural language processing model to generate a word vector corresponding to a second word in the word sequence, wherein the word vector is used to represent the second word in the word sequence and a position of the second word;

inputting the word vector into a preset processing layer of the to-be-trained natural language processing model, wherein the preset processing layer comprises an encoder and a decoder;

predicting whether the two paragraphs are adjacent, and the replaced first word in the two paragraphs, to obtain a prediction result, based on a processing result output by the preset processing layer;

acquiring reference information of the two paragraphs, and training the to-be-trained natural language processing model to obtain a trained natural language processing model, based on the prediction result and the reference information, wherein the reference information comprises adjacent information indicating whether the two paragraphs are adjacent, and the replaced first word;

acquiring first sample information, wherein the first sample information comprises a first paragraph word sequence obtained by performing word segmentation on a first target paragraph, and a first specified attribute;

inputting the first sample information comprising the first paragraph word sequence and the first specified attribute into the trained natural language processing model to predict correlation information, wherein the correlation information is used to indicate a correlation value between the first paragraph word sequence and the first specified attribute, and the correlation value is determined by determining whether the first specified attribute or a meaning of the first specified attribute is included in the first paragraph word sequence; and training the trained natural language processing model to obtain a first model, based on predicted correlation information and correlation information for labeling the first sample information, wherein a loss value is calculated based on the correlation information for labeling the first sample information and the predicted correlation information to implement further training of the trained natural language processing model.

* * * * *